(12) United States Patent
Cremer

(10) Patent No.: US 9,254,930 B2
(45) Date of Patent: Feb. 9, 2016

(54) METHOD OF STORING AND PICKING

(75) Inventor: Holger Cremer, Düsseldorf (DE)

(73) Assignee: Dematic GmbH, Offenbach (DE)

( * ) Notice: Subject to any disclaimer, the term of this patent is extended or adjusted under 35 U.S.C. 154(b) by 761 days.

(21) Appl. No.: 13/557,829

(22) Filed: Jul. 25, 2012

(65) Prior Publication Data

US 2013/0186044 A1 Jul. 25, 2013

(30) Foreign Application Priority Data

Jul. 27, 2011 (DE) .......................... 10 2011 052 193

(51) Int. Cl.
*B65G 1/04* (2006.01)
*B65B 5/10* (2006.01)
*B65G 1/137* (2006.01)

(52) U.S. Cl.
CPC ................ *B65B 5/10* (2013.01); *B65G 1/1378* (2013.01)

(58) Field of Classification Search
CPC ...... B65G 1/04; B65G 1/1375; B65G 1/1378; B65G 1/026; B65G 1/137
USPC ............. 53/473, 443, 474, 475; 414/803, 807
See application file for complete search history.

(56) References Cited

U.S. PATENT DOCUMENTS

| | | | |
|---|---|---|---|
| 5,934,413 A | 8/1999 | Koenig et al. | |
| 6,923,612 B2 | 8/2005 | Hansl | |
| 7,963,384 B2 * | 6/2011 | Lafontaine | 198/349 |
| 8,494,673 B2 | 7/2013 | Miranda et al. | |
| 8,556,567 B2 * | 10/2013 | Schafer | B65G 1/1378 414/286 |
| 8,594,835 B2 * | 11/2013 | Lert et al. | B65G 1/045 414/267 |
| 8,616,822 B2 * | 12/2013 | Winkler | A47F 10/00 211/151 |
| 8,827,619 B2 * | 9/2014 | Schafer | 414/268 |
| 8,851,827 B2 | 10/2014 | Burgstaller et al. | |

(Continued)

FOREIGN PATENT DOCUMENTS

| | | |
|---|---|---|
| AT | 506221 A4 | 7/2009 |
| AT | 507811 A1 | 8/2010 |

(Continued)

OTHER PUBLICATIONS

Extract Out of Handbook Logistik, 3, Reprocessed Edition, Edition 2008.

(Continued)

*Primary Examiner* — Gloria R Weeks
(74) *Attorney, Agent, or Firm* — Gardner, Linn, Burkhart & Flory, LLP

(57) ABSTRACT

A method of storing and picking individual articles and/or packaging units in a storage system includes separating and transferring individual articles from incoming-load carriers and depalletizing and separating packaging units from incoming-load carriers. Individual articles, load carriers and packaging units are transported to a warehouse for intermediate storage of individual articles on or in load carriers and packaging units. Individual articles and packing units are picked at a picking area and the picked articles or packing units loaded onto order-load carriers. Individual articles, load carriers and packaging units are transported from the warehouse to the picking area. Load carriers are used only for the transportation and storage of non-conveyable individual articles or non-conveyable packing units and conveyable packaging units and wherein conveyable individual articles are transported and stored directly and without load carriers.

22 Claims, 2 Drawing Sheets

(56) References Cited

U.S. PATENT DOCUMENTS

| | | | |
|---|---|---|---|
| 8,965,561 B2* | 2/2015 | Jacobus et al. | 700/214 |
| 2004/0220694 A1* | 11/2004 | Stingel et al. | 700/216 |
| 2005/0138897 A1* | 6/2005 | Lancaster, III et al. | B65B 11/045 53/441 |
| 2007/0005180 A1* | 1/2007 | Stingel et al. | 700/213 |
| 2007/0125727 A1* | 6/2007 | Winkler | 211/59.2 |
| 2009/0112675 A1* | 4/2009 | Servais | 705/8 |
| 2009/0136333 A1* | 5/2009 | Schafer | 414/807 |
| 2009/0139188 A1* | 6/2009 | Schafer | B65G 1/1378 53/474 |
| 2010/0262278 A1* | 10/2010 | Winkler | 700/218 |
| 2010/0272546 A1 | 10/2010 | Wolkerstorfer | |
| 2010/0316470 A1* | 12/2010 | Lert et al. | 414/273 |
| 2011/0058926 A1* | 3/2011 | Winkler | 414/795.4 |
| 2011/0106295 A1 | 5/2011 | Miranda et al. | |
| 2012/0207567 A1 | 8/2012 | Koholka | |
| 2014/0088748 A1* | 3/2014 | Woodtli et al. | 700/113 |
| 2014/0277691 A1* | 9/2014 | Jacobus et al. | 700/216 |
| 2014/0343716 A1* | 11/2014 | Sweet et al. | 700/217 |
| 2015/0098775 A1* | 4/2015 | Razumov | B65G 1/0407 414/282 |

FOREIGN PATENT DOCUMENTS

| | | |
|---|---|---|
| AT | 508361 A4 | 1/2011 |
| DE | 3927203 A1 | 2/1991 |
| DE | 102004056865 A1 | 6/2006 |
| DE | 102006025617 A1 | 11/2007 |
| DE | 102008011537 A1 | 9/2009 |
| DE | 102009033697 A1 | 1/2011 |
| EP | 0733563 A1 | 9/1996 |
| EP | 0776308 B1 | 11/2000 |
| EP | 1042199 B1 | 4/2003 |
| EP | 1698573 B1 | 1/2008 |
| EP | 2327644 A1 | 6/2011 |
| WO | 9933723 A1 | 7/1999 |
| WO | 2007009136 A1 | 1/2007 |
| WO | 2007124796 A1 | 11/2007 |
| WO | 2008003754 A1 | 1/2008 |
| WO | 2009086578 A1 | 7/2009 |
| WO | 2009143548 A1 | 12/2009 |
| WO | 2010022832 A1 | 3/2010 |

OTHER PUBLICATIONS

Grenzebach Brochure, entitled "Automated Baggage Handling."
Affidavit by Bastiaan Maria Ludovicus Dumoulin of public prior use, Sorbo, mid-2010.

* cited by examiner ated and transported on or in load carriers and on the other hand conveyable individual articles or packaging units, i.e., most of the individual articles and packing units, are handled without load carriers, it is possible to reduce the proportion of space previously occupied but not used by the load carriers. For instance, the conveyable individual articles and packaging units can be placed at a smaller spaced interval with respect to each other in the warehouse and on the conveyance technology compared to when the space is occupied in an identical manner by load carriers. The use of load carriers takes into account the non-conveyable individual articles and packing units which are difficult to handle.

METHOD OF STORING AND PICKING

BACKGROUND OF THE INVENTION

The invention relates to a method of storing and picking individual articles and/or packaging units in a storage system.

In modern central warehouses for supplying retailers, the goods are supplied on pallets and are intermediately stored on trays once they have been depalletized and separated into individual articles and packing units. For a corresponding order, the required articles and packing units are then retrieved from the warehouse and are supplied in a sorted or sequenced fashion to a picking station, where the individual articles and packing units, in turn, are packed onto pallets or rolling carts for dispatch.

The demands placed upon these storage and picking systems are high. For instance, in spite of a broad spectrum of articles, it should be possible to make optimum use of the space in the warehouse and to achieve a large throughput at the picking stations while keeping operating costs as low as possible.

EP 1 698 573 B1 discloses an automated storage system for storing and picking articles and a corresponding method, in which there is provided a device for separating supplied articles into packing units and for transferring them onto trays, a tray store for storing the packing units on the trays, removal-conveyance technology for removal and for provision of the packing units sequenced for loading onto order-load carriers, and a loading station for loading the packing units onto the order-load carriers. Therefore, continuously flat tray-shaped load carriers, so-called trays, are used for transporting and storing all articles or packing units.

DE 10 2009 033 697 A1 discloses a method for storing and picking articles in the form of individual articles and/or packaging units in a storage system consisting of a pallet racking system for storing articles supplied on incoming goods-load carriers, a device for depalletizing, separating and transferring articles from incoming goods-load carriers to transport-load carriers, a racking system for storing separated articles as an intermediate buffer prior to picking, at least one picking station, in which articles are loaded onto a destination-load carrier, and conveyance technology for transporting separated articles to the racking system and from the racking system to the picking station, wherein transport-load carriers are used for transporting separated articles on the conveyance technology. The method corresponds in this regard to the one above, wherein the only modification thereto is that articles separated in the store are stored without transport-load carriers.

EP 0 776 308 B1 likewise discloses a picking method, in which flat tray-shaped load carriers are continuously used. In the described picking method, distribution units which comprise at least one but preferably several units and are compiled in an article-specific way are compiled into several large units comprising such distribution units, wherein the distribution units are taken from the arriving large units and intermediately stored, whereupon from these intermediately stored distribution units the individual orders are compiled and put into transport containers. The distribution units are each placed one-by-one on a respective goods carrier provided with a code and the data of the distribution unit located on the relevant goods carrier are supplied to a computer and are allocated to the goods carrier receiving this distribution unit and then the goods carriers are inserted into storage containers and are transported with the storage containers and intermediately stored, after which the distribution units of different goods which are each intended for a specific order, together with the goods carriers carrying the same are removed from the storage containers with the help of a computer and inserted into consignment containers and brought with the same to a removal station where they are removed, again with the help of a computer, from the consignment containers according to a predetermined packing order.

SUMMARY OF THE INVENTION

The trays used in prior methods take up a relatively large amount of space in terms of their surface area in relation to the transported article or packing unit. Moreover, it is costly to provide the trays in each case in a specific manner so that in most cases even separate conveyance technology is required for empty trays.

In contrast, the present invention provides a method of storing and picking which permits optimized utilization of space in the warehouse and at the same time reduces operating costs. Also, conveyance technology optimized and adapted to the conveyed goods should also be facilitated and the requirement for empty transport-load carriers can be minimized.

A method of storing and picking individual articles and/or packaging units in a storage system, according to an aspect of the invention, includes separating and transferring individual articles from incoming-load carriers and depalletizing and separating packaging units from incoming-load carriers. Individual articles, load carriers and packaging units are transported to a warehouse for intermediate storage of individual articles on or in load carriers and packaging units. Individual articles and packing units are picked at a picking area and the picked articles or packing units loaded onto order-load carriers. Individual articles, load carriers and packaging units are transported from the warehouse to the picking area. Load carriers are used only for the transportation and storage of non-conveyable individual articles or non-conveyable packaging units and conveyable packaging units and wherein conveyable individual articles are transported and stored directly and without load carriers.

By virtue of the fact that, in accordance with this aspect of the invention, only non-conveyable individual articles or packing units are stored and transported on or in load carriers and on the other hand conveyable individual articles or packing units, i.e., most of the individual articles and packing units, are handled without load carriers, it is possible to reduce the proportion of space previously occupied but not used by the load carriers. For instance, the conveyable individual articles and packaging units can be placed at a smaller spaced interval with respect to each other in the warehouse and on the conveyance technology compared to when the space is occupied in an identical manner by load carriers. The use of load carriers takes into account the non-conveyable individual articles and packing units which are difficult to handle.

Therefore, the use of load carriers is thus reduced overall, which on the one hand permits optimization of the usage of space in the warehouse and on the other hand also permits improved utilization of the conveyance technology, since, e.g., the stowage position length can be configured variably by the articles or packing units and the load carriers make fewer empty runs. The empty load carrier conveyance technology can also be reduced, thus lowering operating costs. It is understood that several individual articles can also be transported and stored in or on each load carrier.

In a detailed embodiment of the invention, a packing unit is understood to be a packing drum as a trading unit and loading unit for goods distribution. It is a combination of products of the same or different type for collective handling in logistics operations (e.g., ordering by the retail trade). A packing drum stands for a package, the entirety of packaged goods and packaging, a packing piece, the package to be transported and a package consisting of one piece, as an empty packing drum.

The incoming goods-load carriers mostly used include pallets, on which the goods are supplied by the producer/manufacturer and optionally are intermediately stored in a pallet store until they are needed. Order-load carriers which are typically used include rolling carts, pallets or larger paperboard containers and returnable containers.

The term "conveyable" as used herein refers to the characteristic of the products provided as individual articles or packing units to be transported and handled without load carriers (trays, containers, etc.), directly and automatically by means of known conveyance technology including the corresponding load receiving means without the conveyance technology coming to a standstill by reason of the individual articles or packing units getting jammed, caught, wedged, falling over, etc.; whereas "non-conveyable" means that these individual articles or packing units are so heterogeneous or inhomogeneous in terms of their characteristics (position of centre of gravity, outer sleeve/packaging, etc.) that they cannot be transported automatically in a problem-free manner or without becoming damaged.

Conveyable individual articles or packing units may be those which have a surface area or standing surface greater than or equal to 10 cm×10 cm and which can be transported safely. It has actually been found that this covers most of the spectrum of articles in retail trade. In principle, it is possible in terms of utilization of space to handle even the very smallest individual articles without load carriers. However, in technical terms, this may not be reliably achieved which means that problems during transport would outweigh any advantages.

In this sense, safe transportation is to be understood to be reliable transportation without any interruption and need for manual intervention, as the facility should have availabilities (without any hold-ups caused by transport problems) of greater than 99%. The picking facility may be designed as an automatic picking station by means of robots, etc., so that together with a corresponding automation of the depalletizing and separating procedures as well as conveyance technology a considerable level of automation is achieved. However, it is understood that even manual picking and/or depalletizing can be used within the scope of the invention. There are even environments or product ranges which do not permit automation.

Containers may be used as load carriers, in particular when for emptying purposes they have a floor, which can be lifted out, or a pivotable sidewall, which means that they can be emptied in a similar manner to trays, while accepting a longer lifting distance.

In the warehouse conveyable individual articles, packaging units may be directly intermediately stored and non-conveyable individual articles (or several individual articles) and packaging units are intermediately stored in containers. It is understood that sorted and sequenced removal from storage and transportation of individual articles and packing units to the picking station may be used within the framework of possibilities.

In order to be able to handle the non-conveyable individual articles on or in load carriers and at the same time to be also able to handle the conveyable, possibly larger, articles and packing units directly, the conveyance technology may include a load receiving means which comprises a transport surface and a pair of telescopic arms disposed on opposite sides of the transport surface. Each telescopic arm can be extended transversely with respect to the direction of travel. Each telescopic arm includes three or four or more pivotable carriers, or fingers, which can be pivoted between a working position, which protrude from the telescopic arms toward each other over the transport surface, and a rest position lowered in the telescopic arm. The spacing between the telescopic arms may be mutually adjustable.

Further details and advantages of the invention are apparent from the description hereinafter of an exemplified embodiment with reference to the single drawing schematically illustrating a storage and picking system with the implementation of a method of storing and picking in accordance with the invention.

DESCRIPTION OF THE PREFERRED EMBODIMENT

Figure 1:
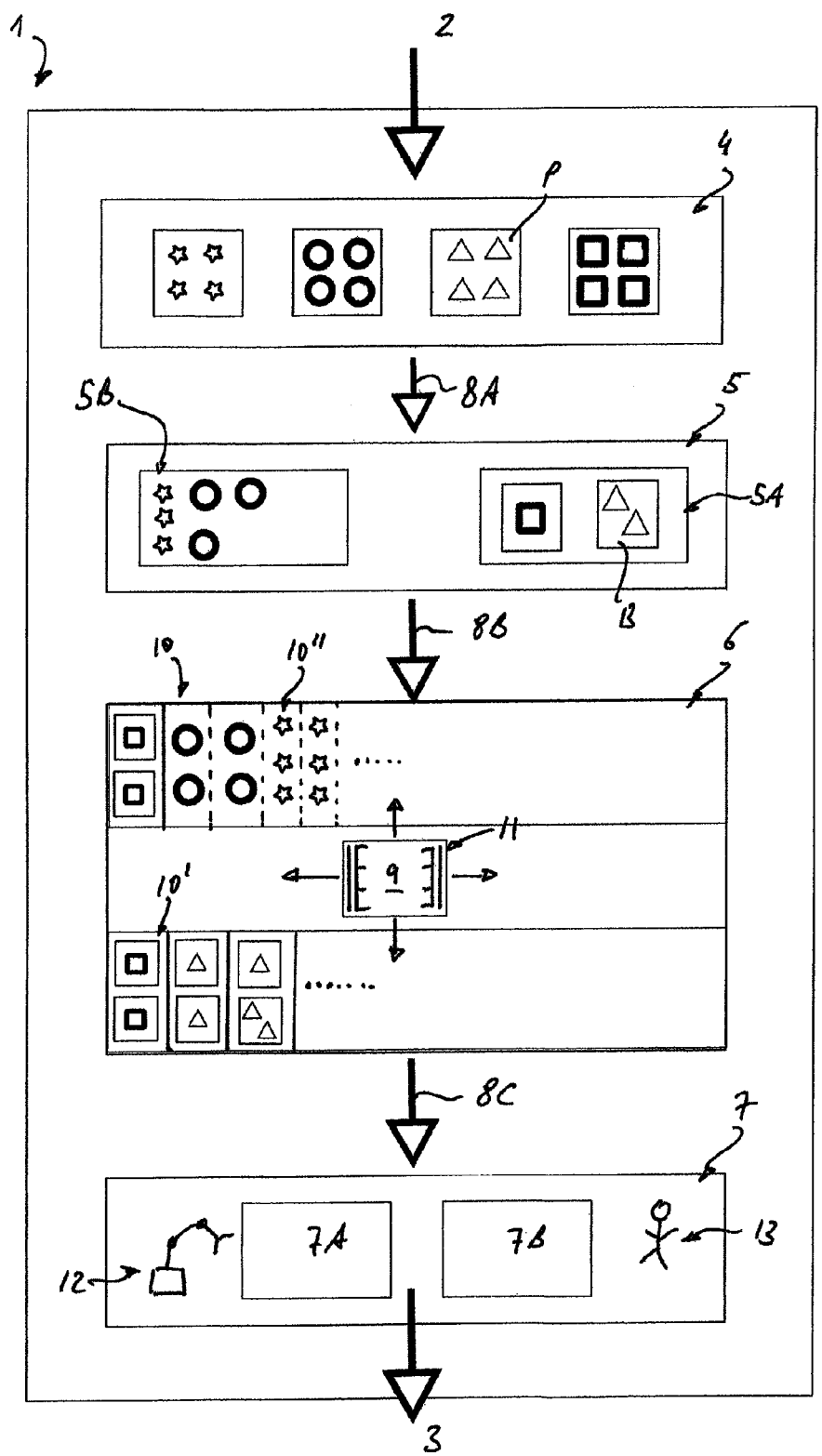
FIG. 1 illustrates a top plan view of a distribution warehouse that supports trading operations.
Figure 2:
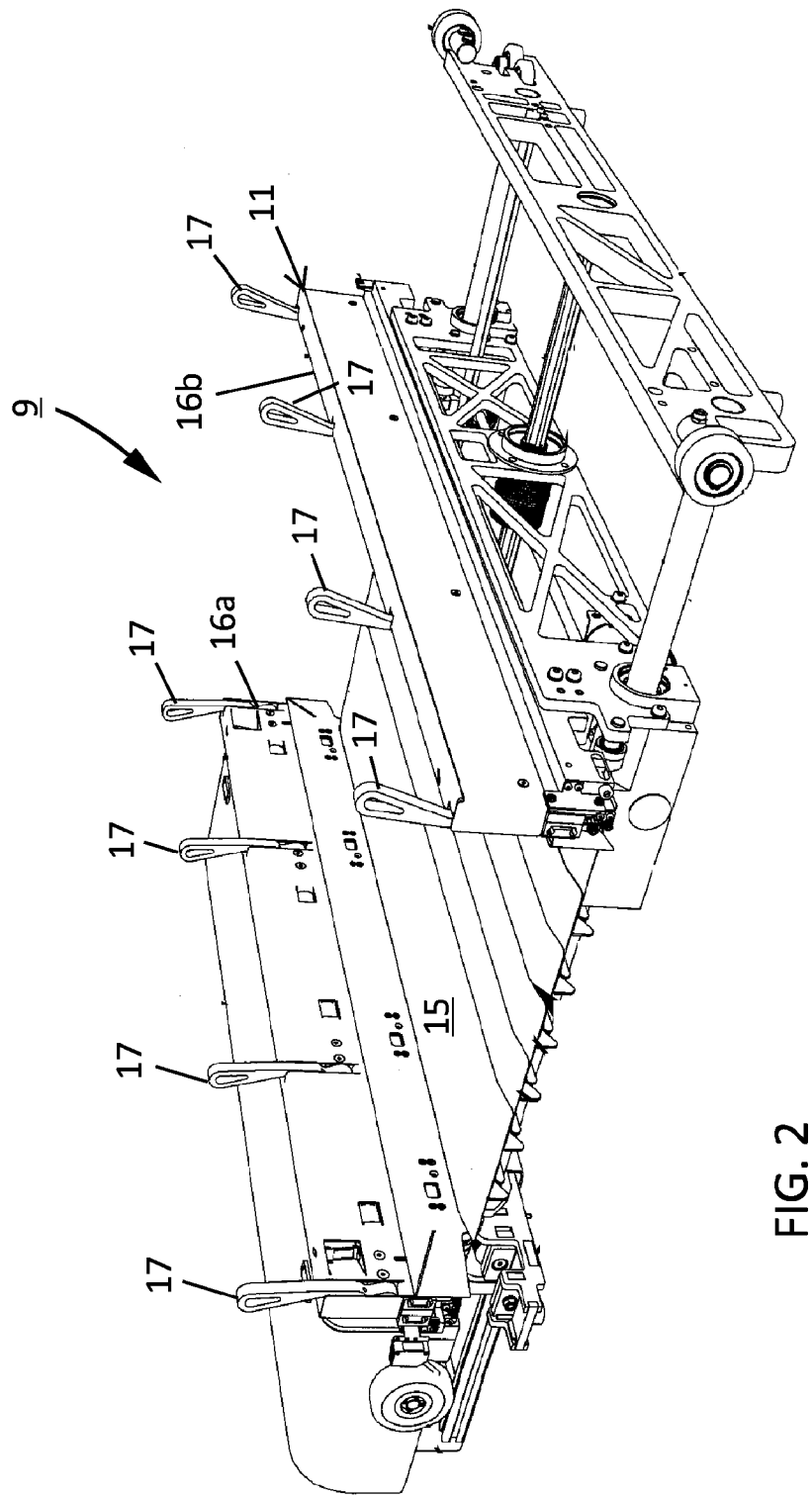
FIG. 2 is a perspective view illustrating a shuttle.

Referring now specifically to the drawing, and the illustrative embodiments depicted therein, a distribution warehouse 1 includes an incoming goods department 2 for delivery of products on pallets, wherein the different products P1, P2, P3 and P4 are symbolized as stars, circles, triangles and squares, respectively. Distribution warehouse 1 also includes an outgoing goods department 3 for transferring and distributing the order-load carriers compiled (picked) for the individual retail businesses. Upon receipt of the goods or products at the incoming goods department 2, they may undergo reception inspection before entering a pallet warehouse 4 for intermediate storage of the products supplied on pallets, namely P1 (stars), P2 (circles), P3 (triangles) and P4 (squares).

If the products located in the pallet warehouse 4 are required for orders, then the pallets are retrieved from the warehouse and supplied via suitable conveyance technology 8A, such as a pallet conveyor, to a depalletizing and separating device 5. At this location, non-conveyable individual articles in a device 5A, in this case products P3 (triangles) and P4 (squares), are transferred from the pallets P into containers B after separation for transportation and storage. It is understood that several individual articles can optionally also be placed into each container B. All of the remaining, i.e., conveyable, products, in this case P1 (stars) and P2 (circles) are transported and stored directly and without load carriers, so that they are only depalletized and separated in a further device 5B. The loaded containers B and also the directly conveyable products are then supplied via suitable conveyance technology 8B to a high rack warehouse 6, in which the products are intermediately stored.

A high rack warehouse 6 includes several levels and lanes of racks having a large number of storage spaces 10 which are only indicated. The storage spaces 10' for the containers B may have a fixed width and at the same time permit double-depth storage. The storage spaces 10" for the direct storage of the conveyable products can have different widths depending upon the product and also permit at the same time double-depth or even triple-depth storage. Therefore, depending upon the product range a larger number of products of conveyable products can be stored, as their spacing in the warehouse is then not confined to the container dimensions as in the case of the storage spaces 10'.

High rack warehouse 6 is serviced by means of a satellite vehicle or shuttle 9. It is operated in a captive operation, i.e., one shuttle is used for each level of the warehouse 6 which receives or releases, via the lifts, not illustrated, the products or containers B which are to be put into storage or removed from storage. The lifts can be disposed at the ends of the warehouse aisles as well as integrated in the racking itself. Such warehouse may be of the type disclosed in International Patent Application Publication No. WO 2012/044734 A1, the disclosure of which is hereby incorporated herein by reference.

Shuttles 9 each include a load receiving means 11 which is suitable for variable direct handling of the different conveyable products and also the containers. Shuttle 9 includes a transport surface 15, which can be a fixed surface or driven surface, and a pair of telescopic arms 16a, 16b on opposite sides of the transport surface 15. Each telescopic arm 16a, 16b can be extended transversely with respect to the direction of travel. Each telescopic arm 16a, 16b includes three or four pivotable carriers, or fingers, 17 which can be pivoted between a working position, which protrudes from the telescopic arm 16a, 16b toward each other over the transport surface 15, and a rest position lowered in the telescopic arm 16a, 16b. The spacing between the telescopic arms 16a, 16b is mutually adjustable. The fingers 17 serve to push the respective container or product from the transport surface 15 into the racking or to pull same from the racking onto the transport surface 15. The fingers 17 can each be controlled individually, so that depending upon the container or product and storage depth the working position or rest position can be assumed in a specific manner.

Depending upon requirement, the containers and products are removed from storage and transported from the warehouse 6 in a sorted and sequenced fashion to a picking area 7 via suitable conveyance technology 8C. It is understood that the conveyance technology 8B and 8C is suitable for conveying conveyable products directly as well as containers. Conveyor belts or suitable roller conveyors with the rollers at a small spaced interval with respect to each other can be used. Depending upon requirement and capability, either automatic picking 7A by means of robots 12 or manual picking 7B (picker 13) of the products associated with an order takes place on order-load carriers (typically rolling carts or pallets) in the picking area 7. Once an order has been put together, the respective order-load carrier is passed to the outgoing goods department 3.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

The embodiments of the invention in which an exclusive property or privilege is claimed are defined as follows:

1. A method of storing and picking at least one chosen from individual articles and packaging units in a storage system, said method comprising:

depalletizing, separating and transferring individual articles from incoming-load carriers and positioning non-conveyable ones of the individual articles in load carriers;

depalletizing and separating packaging units from incoming-load carriers and positioning non-conveyable ones of said packaging units in load carriers;

transporting conveyable individual articles, load carriers and conveyable packaging units to a warehouse and storing conveyable individual articles, load carriers and conveyable packaging units in the warehouse;

picking at least one chosen from individual articles and packaging units at a picking area and loading the picked articles or packaging units onto order-load carriers; and transporting conveyable individual articles, load carriers and conveyable packaging units from the warehouse to the picking area, wherein load carriers are used only for the transportation and storage of non-conveyable individual articles and non-conveyable packing units and wherein conveyable individual articles and conveyable packaging units are transported and stored directly and without load carriers, wherein the warehouse includes storage spaces for the conveyable individual articles and conveyable individual article or conveyable packaging unit depends upon the width of the conveyable individual article or conveyable packaging unit.

2. The method as claimed in claim 1, wherein conveyable individual articles or conveyable packaging units comprise a surface area greater than or equal to 10 cm×10 cm.

3. The method as claimed in claim 2, wherein the picking includes automatic or manual picking.

4. The method as claimed in claim 3, wherein the load carriers are containers.

5. The method as claimed in claim 4 including emptying the containers, wherein the containers comprise a floor that can be lifted out or a pivotable sidewall.

6. The method as claimed in claim 3 including removing from storage and transporting to the picking area in a sorted and sequenced manner the conveyable individual articles, load carriers and conveyable packaging units.

7. The method as claimed in claim 2, wherein the load carriers are containers.

8. The method as claimed in claim 7 including emptying the containers, wherein the containers comprise a floor that can be lifted out or a pivotable sidewall.

9. The method as claimed in claim 2 including removing from storage and transporting to the picking area in a sorted and sequenced manner the conveyable individual articles, load carriers and conveyable packaging units.

10. The method as claimed in claim 1, wherein the picking includes automatic or manual picking.

11. The method as claimed in claim 10, wherein the load carriers are containers.

12. The method as claimed in claim 11 including emptying the containers, wherein the containers comprise a floor that can be lifted out or a pivotable sidewall.

13. The method as claimed in claim 10 including removing from storage and transporting to the picking area in a sorted and sequenced manner the conveyable individual articles, load carriers and conveyable packaging units.

14. The method as claimed in claim 1, wherein the load carriers are containers.

15. The method as claimed in claim 14 including emptying the containers, wherein the containers comprise a floor that can be lifted out or a pivotable sidewall.

16. The method as claimed in claim 14 including removing from storage and transporting to the picking area in a sorted and sequenced manner the conveyable individual articles, load carriers and conveyable packaging units.

17. The method as claimed in claim 1 including removing from storage and transporting to the picking area in a sorted and sequenced manner the conveyable individual articles, load carriers and conveyable packaging units.

18. The method as claimed in claim 1, wherein said transporting is performed by a shuttle that comprises a transport surface, a pair of telescopic arms disposed on opposite sides of the transport surface, wherein said telescopic arms can be extended transversely with respect to the direction of travel of the shuttle and wherein each of said telescopic arms comprises at least three pivotable fingers which can be moved between a working position, which protrudes from the telescopic arm and a rest position retracted into the telescopic arm, wherein spacing between the telescopic arms is mutually adjustable.

19. The method as claimed in claim 1, wherein said separating and transferring is performed with a depalletizer.

20. The method as claimed in claim 1, wherein said separating and transferring includes depositing the non-conveyable individual articles on or in load carriers.

21. The method as claimed in claim 1, wherein said depalletizing and separating includes depositing the non-conveyable packaging units on or in load carriers.

22. The method as claimed in claim 1 wherein said warehouse comprises multiple stacked racks and wherein the storage spaces for the load carriers' conveyable individual articles and conveyable packaging units are at a same stacked rack in said warehouse.

* * * * *